United States Patent
Shmueli et al.

(10) Patent No.: US 11,879,401 B2
(45) Date of Patent: Jan. 23, 2024

(54) HOMOGENEOUS CHARGE COMPRESSION IGNITION (HCCI-TYPE) COMBUSTION SYSTEM FOR AN ENGINE AND POWERTRAIN USING WET-ALCOHOL AS A FUEL AND INCLUDING HOT ASSIST IGNITION

(71) Applicant: MayMaan Research, LLC, Hollywood, FL (US)

(72) Inventors: Yehuda Shmueli, Davie, FL (US); Eitan Shmueli, Aventura, FL (US); Doron Shmueli, Hollywood, FL (US)

(73) Assignee: Maymaan Research, Inc., Hollywood, FL (US)

(*) Notice: Subject to any disclaimer, the term of this patent is extended or adjusted under 35 U.S.C. 154(b) by 0 days.

(21) Appl. No.: 18/123,624

(22) Filed: Mar. 20, 2023

(65) Prior Publication Data
US 2023/0228224 A1    Jul. 20, 2023

Related U.S. Application Data

(63) Continuation-in-part of application No. 17/199,800, filed on Mar. 12, 2021, now Pat. No. 11,608,771.
(Continued)

(51) Int. Cl.
*F02D 19/06* (2006.01)
*F02B 1/12* (2006.01)
*F02M 25/03* (2006.01)

(52) U.S. Cl.
CPC ............ *F02D 19/0655* (2013.01); *F02B 1/12* (2013.01); *F02D 19/0689* (2013.01);
(Continued)

(58) Field of Classification Search
CPC ............ F02D 19/0655; F02D 19/0689; F02D 19/084; F02D 19/12; F02B 1/12; F02B 2201/062; F02M 25/03; F02M 25/0227; F02M 25/0228; F02M 2200/956; Y02T 10/12; Y02T 10/30
See application file for complete search history.

(56) References Cited

U.S. PATENT DOCUMENTS

| 8,245,690 B2 * | 8/2012 | Stein ................. F02D 19/061 123/304 |
| 2007/0163537 A1 * | 7/2007 | Kamio ............... F02D 19/0689 123/304 |

(Continued)

*Primary Examiner* — Grant Moubry
(74) *Attorney, Agent, or Firm* — Dinsmore & Shohl LLP

(57) ABSTRACT

An internal combustion-type engine or powertrain that is capable of burning wet-alcohol fuel mixture and including a piston reciprocating within a cylinder attached to a cylinder head and connecting to a crank shaft via a connecting rod. An intake cam and valve is mounted within an intake port formed in the cylinder head and an exhaust cam and valve is mounted within an exhaust port also formed in the cylinder head. A pressurized fuel source is introduced into the cylinder by a fuel injector and the percentage of water in the alcohol/water mix operates to prolong the cylinder pressure in order to increase a mean effective pressure (IMEP), leading to a higher torque (improved Brake Mean Effective Pressure—BMEP) of the engine via a longer pressure pulse attained during the period of preferred mechanical advantage of the crank-arm of the engine.

21 Claims, 7 Drawing Sheets

Related U.S. Application Data

(60) Provisional application No. 62/990,104, filed on Mar. 16, 2020.

(52) U.S. Cl.
CPC ....... *F02M 25/03* (2013.01); *F02B 2201/062* (2013.01); *F02M 2200/956* (2013.01)

(56) References Cited

U.S. PATENT DOCUMENTS

| | | | | |
|---|---|---|---|---|
| 2007/0235002 A1* | 10/2007 | Blank | ............... | F02B 11/00 123/305 |
| 2010/0183993 A1* | 7/2010 | McAlister | ............ | F02D 41/401 123/41.31 |
| 2011/0048374 A1* | 3/2011 | McAlister | ............ | F02M 57/06 123/436 |
| 2011/0132320 A1* | 6/2011 | Ulrey | ............... | F02M 31/08 123/557 |
| 2015/0300296 A1* | 10/2015 | Mulye | ............. | F02M 21/08 123/676 |

* cited by examiner

| | | Engine RPM | | | | | | | | |
|---|---|---|---|---|---|---|---|---|---|---|
| | | 1000 | 1500 | 1750 | 2000 | 2250 | 2500 | 2750 | 3000 | 4000 |
| Inlet Manifold Pressure | 100 | 250 | 250 | 250 | 250 | 305 | 360 | 360 | 425 | 425 |
| | 95 | 257 | 265 | 269 | 273 | 318 | 362 | 360 | 425 | 425 |
| | 90 | 264 | 280 | 288 | 297 | 330 | 364 | 360 | 425 | 426 |
| | 85 | 271 | 295 | 308 | 320 | 343 | 366 | 360 | 414 | 416 |
| | 80 | 278 | 310 | 327 | 343 | 355 | 368 | 366 | 393 | 393 |
| | 75 | 284 | 326 | 346 | 367 | 368 | 369 | 360 | 390 | 360 |
| | 70 | 291 | 341 | 365 | 390 | 381 | 371 | 390 | 390 | 390 |
| | 60 | 305 | 347 | 367 | 388 | 382 | 375 | 390 | 390 | 390 |
| | 40 | 333 | 358 | 371 | 384 | 383 | 383 | 390 | 390 | 390 |
| | 20 | 360 | 370 | 375 | 380 | 385 | 390 | 390 | 390 | 390 |

FIG. 7

| | | Engine RPM | | | | | | | | |
|---|---|---|---|---|---|---|---|---|---|---|
| | | 1000 | 1500 | 1750 | 2000 | 2250 | 2500 | 2750 | 3000 | 4000 |
| Inlet Manifold Pressure | 100 | 325 | 350 | 363 | 375 | 388 | 400 | 413 | 425 | 425 |
| | 95 | 324 | 348 | 360 | 373 | 385 | 397 | 409 | 421 | 425 |
| | 90 | 323 | 347 | 358 | 370 | 382 | 394 | 405 | 417 | 426 |
| | 85 | 323 | 345 | 356 | 368 | 379 | 390 | 402 | 413 | 416 |
| | 80 | 322 | 344 | 354 | 365 | 376 | 387 | 398 | 409 | 380 |
| | 75 | 321 | 342 | 352 | 363 | 373 | 384 | 394 | 405 | 380 |
| | 70 | 320 | 340 | 350 | 360 | 370 | 381 | 391 | 401 | 380 |
| | 60 | 319 | 337 | 346 | 356 | 365 | 374 | 383 | 393 | 380 |
| | 40 | 315 | 331 | 338 | 346 | 353 | 361 | 369 | 376 | 380 |
| | 20 | 312 | 324 | 330 | 336 | 342 | 348 | 354 | 360 | 410 |

FIG. 8

HOMOGENEOUS CHARGE COMPRESSION IGNITION (HCCI-TYPE) COMBUSTION SYSTEM FOR AN ENGINE AND POWERTRAIN USING WET-ALCOHOL AS A FUEL AND INCLUDING HOT ASSIST IGNITION

CROSS REFERENCE TO RELATED APPLICATIONS

The present application is a continuation in part of and claims priority from U.S. Ser. No. 17/199,800 filed on Mar. 12, 2021. The ☐800 application claims priority of U.S. Ser. No. 62/990,104 filed Mar. 16, 2020.

FIELD OF THE INVENTION

The present invention relates generally to an internal combustion-type engine or powertrain that is capable of burning wet-alcohol fuel at a very high proportion of water to alcohol. More particularly, the present invention discloses a system and method for an HCCI engine and powertrain with hot assist (e.g. glow plug or spark plug) ignition which provides improved fuel injection and valve timing aspects in combination with oxygenated hydrocarbons (alcohol fuel) with significant water added a varied range of compression ratios. The present invention also seeks to optimize cylinder pressure for longer durations (i.e. across greater crank angles) for achieving improved torque characteristics, this also referred to as brake mean effective pressure (or BMEP).

BACKGROUND OF THE INVENTION

The prior art discloses a variety of prior art references relating to homogeneous charge compression ignition (HCCI) engine technology. A first example of this is set forth in Shibata U.S. Pat. No. 8,038,742 teaches a fuel for HCCI compression.

Simmons, US 2011/0209683, teaches a method of operating a spark ignition engine with a water soluble organic compound of at least 30% by volume water mixed in a homogeneous charge air-fuel mixture with a compression ratio of at least 16:1 prior to spark ignition.

Bromberg, U.S. Pat. No. 8,677,949 teaches a fuel management system for a higher efficiency turbocharged or supercharged spark ignition engine using special properties in methanol which facilitate ultra-dilute operations made possible by addition of hydrogen rich gases. A fuel management control unit operates the engine at a substantially stoichiometric fuel/air ratio during a part of the drive cycle, and at a lean fuel/air ratio during other parts of the drive cycle.

Each of Shmueli et al. U.S. Pat. Nos. 8,869,755, 9,074,555 and 10,436,108 disclose an IC Engine using a Water Based Fuel Mixture. Blank, U.S. Pat. No. 9,010,293 teaches controlling a reduction in heat and required fuel concentration relative to oxygen concentrations for a vehicle combustion cycle.

Finally, Mulye 2015/0300296 teaches an EGR (exhaust gas recirculation system) with compression ratios greater than 12:1 (and up to 30:1 based on the disclosure), and with water to EGR gases in a range of 10%-125% by weight.

SUMMARY OF THE INVENTION

The present invention discloses an aliphatic type alcohol component (methanol, ethanol, propanol, isopropanol or butanol) in combination with a water component. The relative percentages of the alcohol and water components are provided in an inverse range of between 20% to 80% by volume of the fuel mixture and is employed in any type of higher compression cycle (HCCI) for a power train operation, typically with spark or glow plug assist, for providing improved fuel injection and valve timing aspects in combination with oxygenated hydrocarbons (alcohol fuel) with significant water added for achieving a varied range of compression ratios. In this manner, the present invention seeks to optimize cylinder pressure for longer durations (i.e. across greater crank angles) for achieving improved torque characteristics, this also referred to as brake mean effective pressure (or BMEP).

The engine or powertrain applications described herein may include but are not limited to a typical 4-cycle combustion process, and additionally envision other cycle processes (2-cycles or multiple-cycles) having a similar combustion process with cycle variations.

Additional features include modifying the ignition timing (also termed timing advance) of the combustion cycle within the chamber. As the combustion pressure curve is optimized to the crank rod angle, the initiation of combustion is the main timing factor, such that at low RPM (1000-2000 RPM) it is fairly easy to control and optimize where an advance ignition of 30-degree BTDC (Before Top Dead Center) is sufficient. In contrast, at higher RPM☐s, it is not as effective due to the timing the water part of the fuel mixture turning into steam.

In an additional embodiment, the single spark plug utilized with the individual cylinder is substituted by a pair of spark plugs for increasing power output, such as at engine speeds greater than 2500 rpm. The plugs are strategically located from offset angular directions and, in operation, increases the power output by around 7% at engine speed higher then 2500 RPM, which is significant in larger bore engines where the combustion chamber is bigger.

Other features include the use of DME (Dimethyl Ether Ethanol) in the wet fuel mixture, this performing similarly to Ethanol it performs and produces similar power and efficiency. DME is now produced from captured CO2, therefore the use of this fuel in the present system creates a positive effect on global warming concerns, given use of DME from captured Co2.

Elevated heating of the fuel mixture increases efficiency, as it results in more complete combustion of the hydrocarbons in the mix. Specifically, heating of the fuel above the Ethanol boiling point (above 78 degrees C. at no atmospheric pressure), combined with increasing the fuel pressure (such as from approximately 60 psi in normal fuel injector situations to above 2000 psi post fuel pump), results in the wet alcohol (such as ethanol/alcohol) mixture not boiling in the fuel system and only when sprayed to the chamber. The result of this is render improved atomization such heating of the fuel is done without any heat source, we use a heat exchanger where the coolant fluid is flowing on one side and the supply fuel is flowing through the other side.

The engine of the present invention also includes a method whereby it initiates and controls the Start of Combustion (SOC) and which can incorporate a hot initiation source again including, but not limited to, a spark plug or glow plug in any configuration.

The engine can contain either a boosted configuration (not limited to either an engine-driven supercharger or an exhaust gas-driven turbocharger) or can be provided in a normally-aspirated (NA) configuration.

The combustion process is controlled for SOC via the initiation device, and results is a very low overall NOx emission similar to that found in HCCI-type combustion. The high percentage of water in the alcohol/water mix tends to prolong the cylinder pressure which leads to the indicated mean effective pressure (IMEP) to be increased, leading to a higher torque (improved Brake Mean Effective Pressure—BMEP) of the engine via the longer pressure pulse attained during the period of preferred mechanical advantage of the crank-arm of the engine.

The above-described benefits and advantages occur without increases in the friction mean effective pressure (FMEP) or the pumping mean effective pressure (PMEP). In this manner, the specific efficiency of the engine is high, due in part to high compression ratios achieved, as well as including properly chosen valve timing events and proper variation in SOC events based on temperature, speed and load. With regard to exhaust emissions, other exhaust constituents, such and unburned fuel are consistent with HCCI-type combustion and can be controlled via traditional after-treatment means.

BRIEF DESCRIPTION OF THE DRAWINGS

Reference will now be made to the attached drawings, when read in combination with the following detailed description, wherein like reference numerals refer to like parts throughout the several views, and in which:

FIGS. 7 and 8 provide a pair of tabular depictions of inlet manifold pressure for different engine RPM and to show injection timing/angle before top dead center (also defined as end of compression) based on a 720 degrees for a full 4 stroke cycle, with FIG. 7 further depicting a cooler engine configuration 60° Celsius and FIG. 8 a warmer engine configuration of 80° C., this corresponding to an earlier injection condition;

DETAILED DESCRIPTION OF THE PREFERRED EMBODIMENTS

With reference to the attached illustrations, the present invention discloses an internal combustion-type engine or powertrain that is capable of burning wet-alcohol fuel at a very high proportion of water to alcohol and, more specifically, a system and method for an HCCI engine and powertrain with hot assist (e.g. glow park or spark plug) ignition which provides improved fuel injection and valve timing aspects in combination with oxygenated hydrocarbons (alcohol fuel) with significant water added a varied range of compression ratios. As also previously described, the present invention also seeks to optimize cylinder pressure for longer durations (i.e. across greater crank angles) for achieving improved torque characteristics, this also referred to as brake mean effective pressure (or BMEP).

Figure 1:
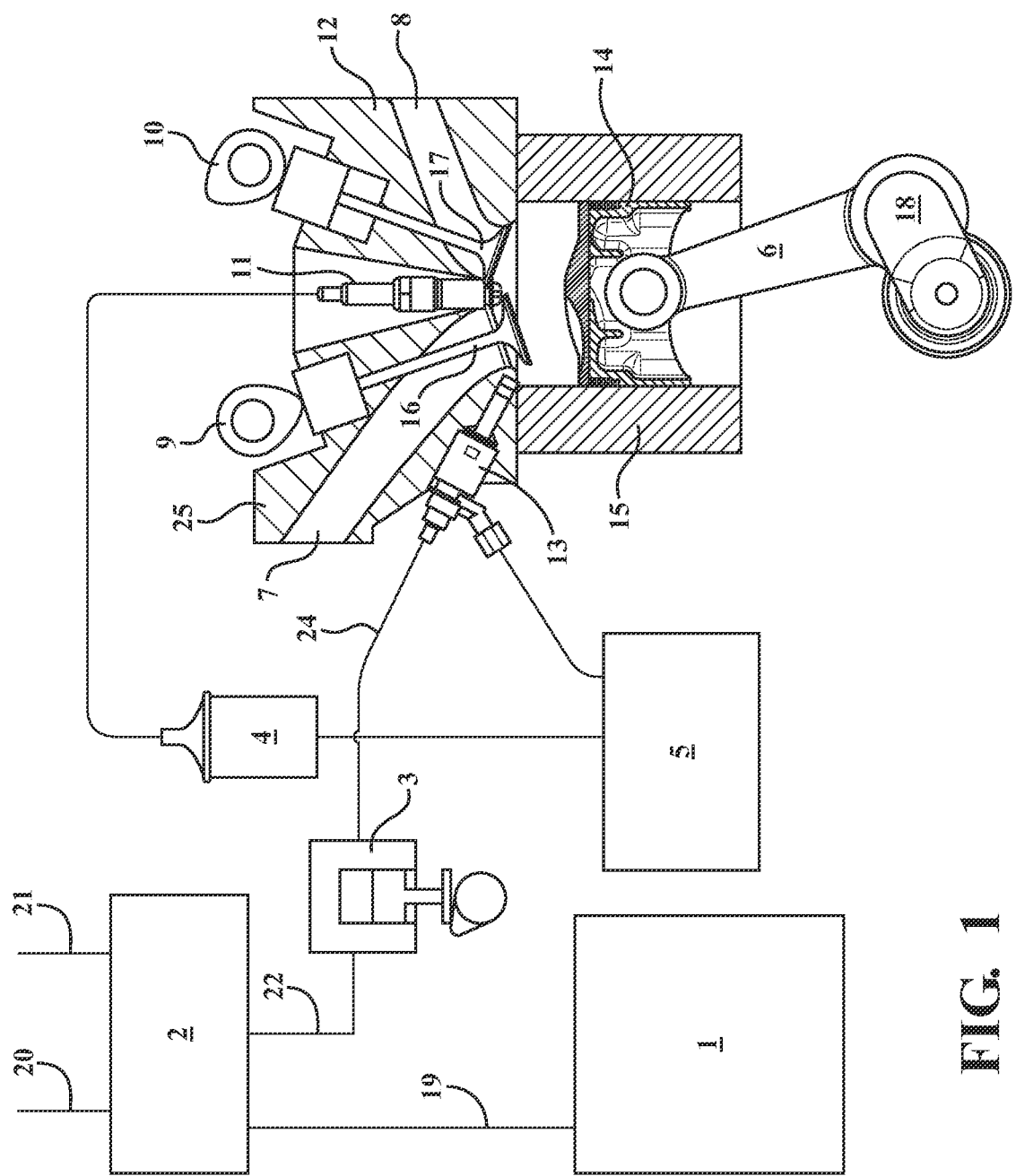
FIG. 1 is a diagrammatic illustration of the HCCI type combustion engine according to a non-limiting embodiment of the present invention.

With reference initially to FIG. 1, a diagrammatic illustration is shown of an HCCI type combustion engine according to a non-limiting embodiment of the present invention. Relevant engine components are represented by a cylinder 15, attached to a cylinder head 12 within which is situated a piston 14 reciprocally driven by a connecting rod 6 (also a crank arm) via a crankshaft 18. Each of an intake valve 16 and exhaust valve 17 are respectively operated by an intake cam 9 and exhaust cam 10 and are further respectively situated within corresponding intake port 7 and exhaust port 8, with ignition triggered by spark plug 11.

A fuel injector 13 is mounted within the cylinder head 12 in proximity to the combustion chamber within the cylinder. An electronic control unit (ECU) is generally represented at 5 and is communicated to the fuel injector 13 and is generally defined to constitute any embedded system in automotive electronics that controls one or more of the electrical systems or subsystems in a vehicle. The ECU 5 separately communicates to the spark plug 11 via an ignition coil 4.

A high pressure fuel pump 3 provides fuel to the injector 13 via a high pressure fuel line 24. Other elements include a fuel tank depicted at 1 which connects, via a cold side fuel feed 19, with a heat exchanger component 2. The heat exchanger 2 is supplied by a coolant fluid inflow on a hot side represented at 20 and a coolant fluid outflow on a cold side further represented at 21 and further communicates, via a fuel line 22 from the engine to the injector 13 via the interposed high pressure fuel pump 3.

Figure 2:
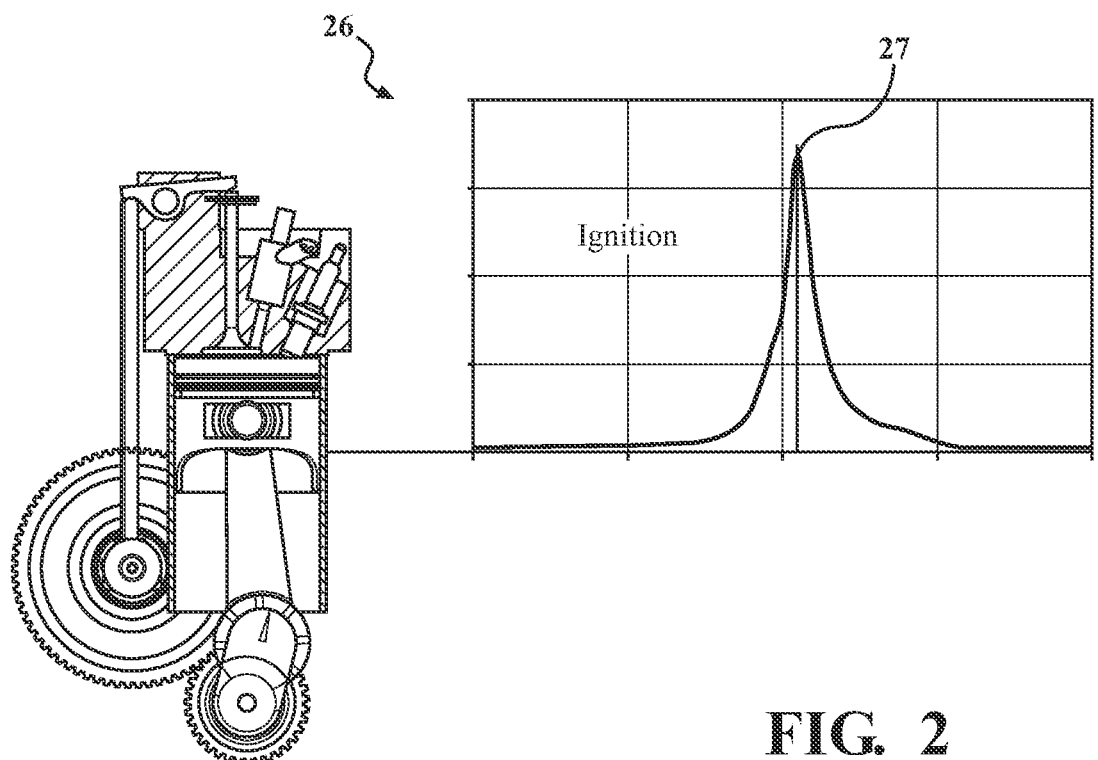
FIGS. 2 and 3 illustrate a pair of graphical depictions of a conventional combustion pressure curve versus crank angle according to the known art of pressure versus crank angle of a spark ignition compression engine with FIG. 3 depicting a point where the crank arm is at a maximum mechanical advantage.
Figure 3:
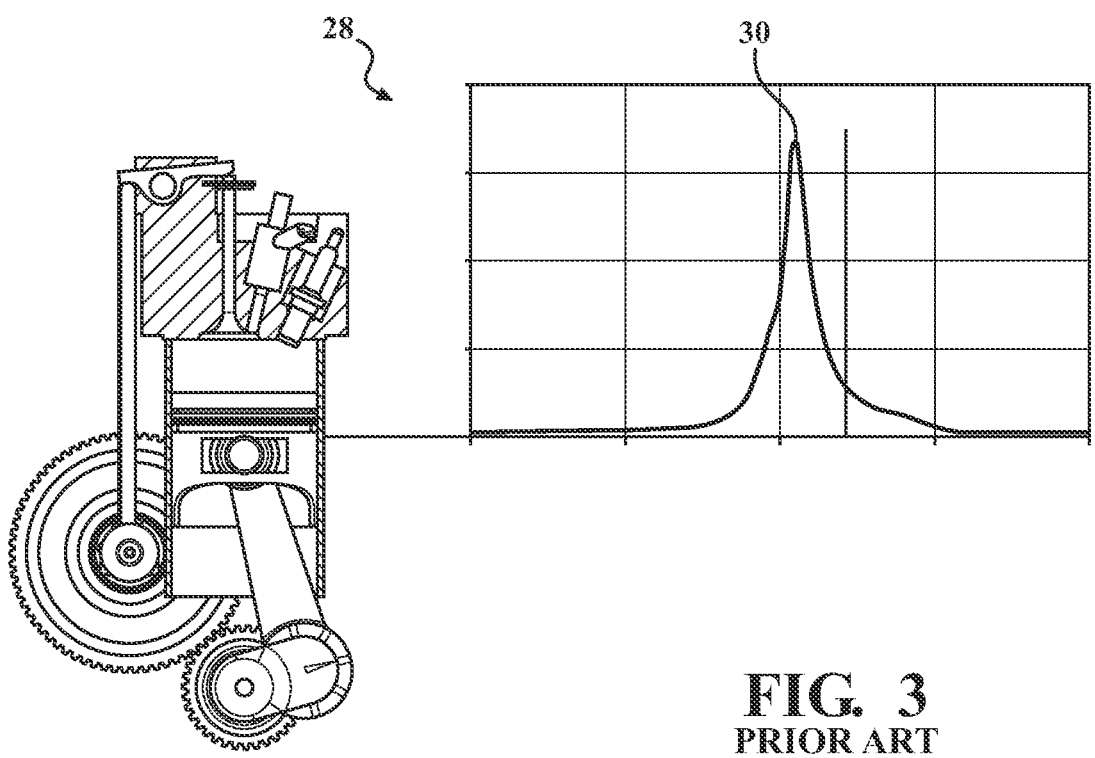

Proceeding to FIGS. 2 and 3, illustrated are a pair of graphical depictions, generally at 26 and 28, according to the known art and depicting a pressure (shown in bars in Y axis representation and at increments of 0, 20, 40, 60 and 80 versus crank angle (depicted in X axis at increments of −360°, 180°, 0, 180° and 360°) of a spark ignition compression engine, and with a maximum mechanical advantage during the ignition stage being shown at 27 in FIG. 2. The point where the crank-arm is at the maximum mechanical advantage is graphically represented at 30 in FIG. 3 and corresponds to a significant reduction in the in-cylinder pressure.

Figure 4:
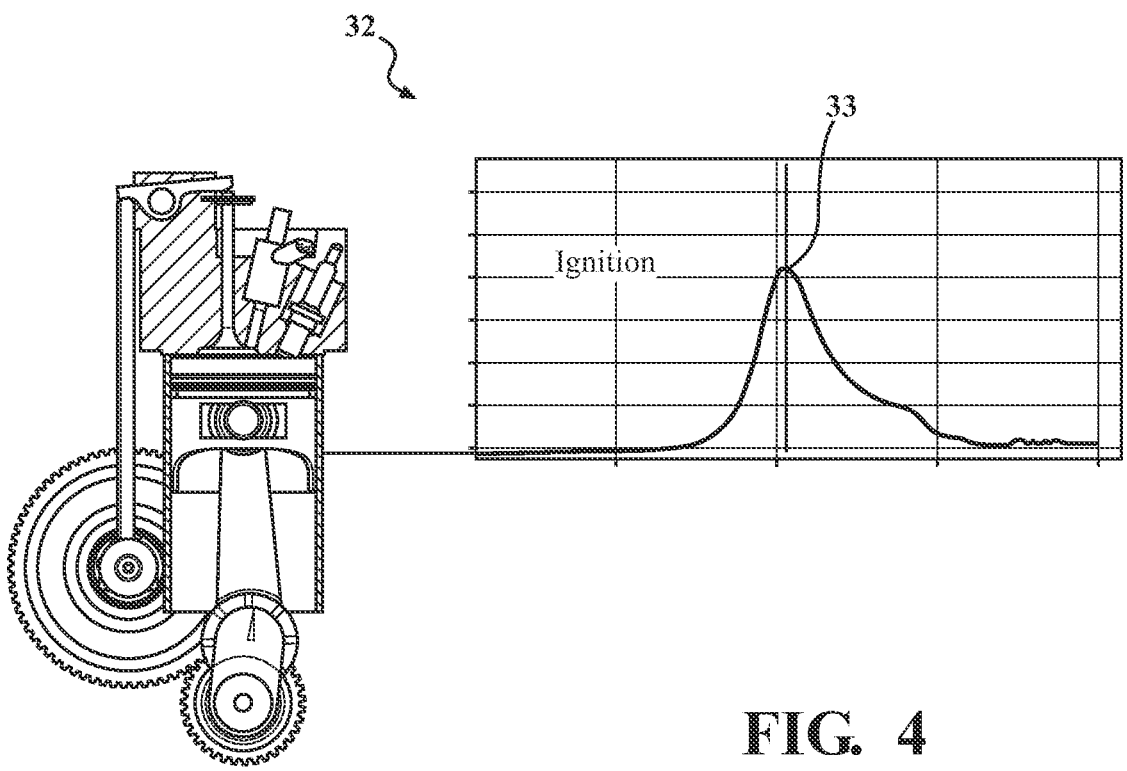
FIGS. 4 and 5 illustrate a pair of graphical depictions correlating to FIGS. 2 and 3 and which depict the unique HCCI combustion assembly of the present invention which depict the in-cylinder pressure maintained for a longer period of the cycle (also defined as crank angle duration) and in order to provide maximum mechanical advantage of the crank arm.
Figure 5:
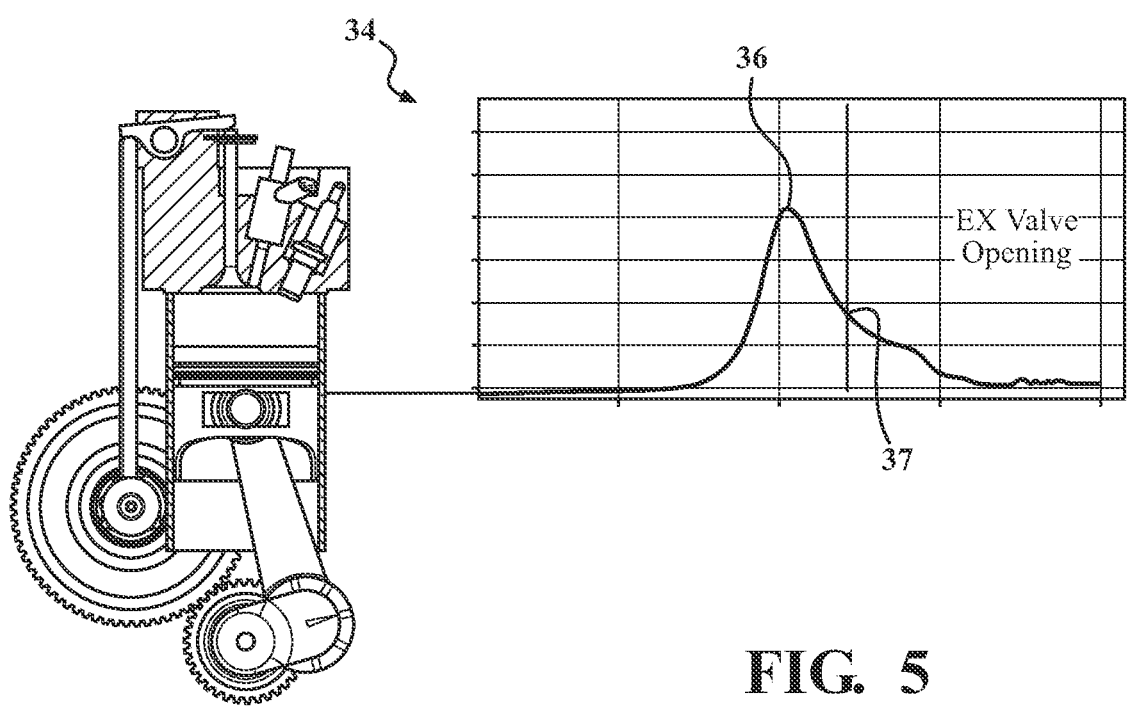

Proceeding now to FIGS. 4 and 5, illustrated are a further pair of corresponding graphical depictions, generally and respectively shown at 32 and 34 and correlating to the Prior Art views of FIGS. 2 and 3, and which depict the unique higher compression cycle (HCCI) combustion assembly utilizing the alcohol-water fuel mixture of the present invention. FIG. 4 represents a maximum mechanical advantage at 33 associated with the ignitions stage, with FIG. 5 further referencing a corresponding maximum advantage at 36 along with a further designation 37 corresponding to the valve opening location. As previously described, the invention contemplates any aliphatic type alcohol component (methanol, ethanol, propanol, isopropanol or butanol) with a water component.

The relative percentages of the alcohol and water components are provided in an inverse range of between 20% to 80% by volume of the overall fuel mixture (e.g. between 20% water/80% alcohol at one end of the range, up to 80% water/20% alcohol at the other end) and which is again is employed in any type of higher compression cycle (HCCI) for a power train operation. In a number of non-limiting applications, a range of 20% to 60% relative alcohol content (in particular in use with ethanol) is provided.

As shown, and with the in-cylinder pressure (Y axis representation) being maintained for a longer period of the cycle (also defined as crank angle duration and as shown by similar depiction along the X-angle), this shown in order to provide maximum mechanical advantage of the crank arm (see as further depicted in FIG. 4 in which the maximum pressure corresponds to the 0° crank angle (top dead center position).

As further shown, the in-cylinder pressure is shown significantly higher during the period of maximum mechanical advantage of the crank-arm. This is further represented at 36 in FIG. 5) and which in comparison to the corresponding prior art view of FIG. 3 illustrates the improvement in engine torque with the attendant benefits in efficiency.

Figure 6:
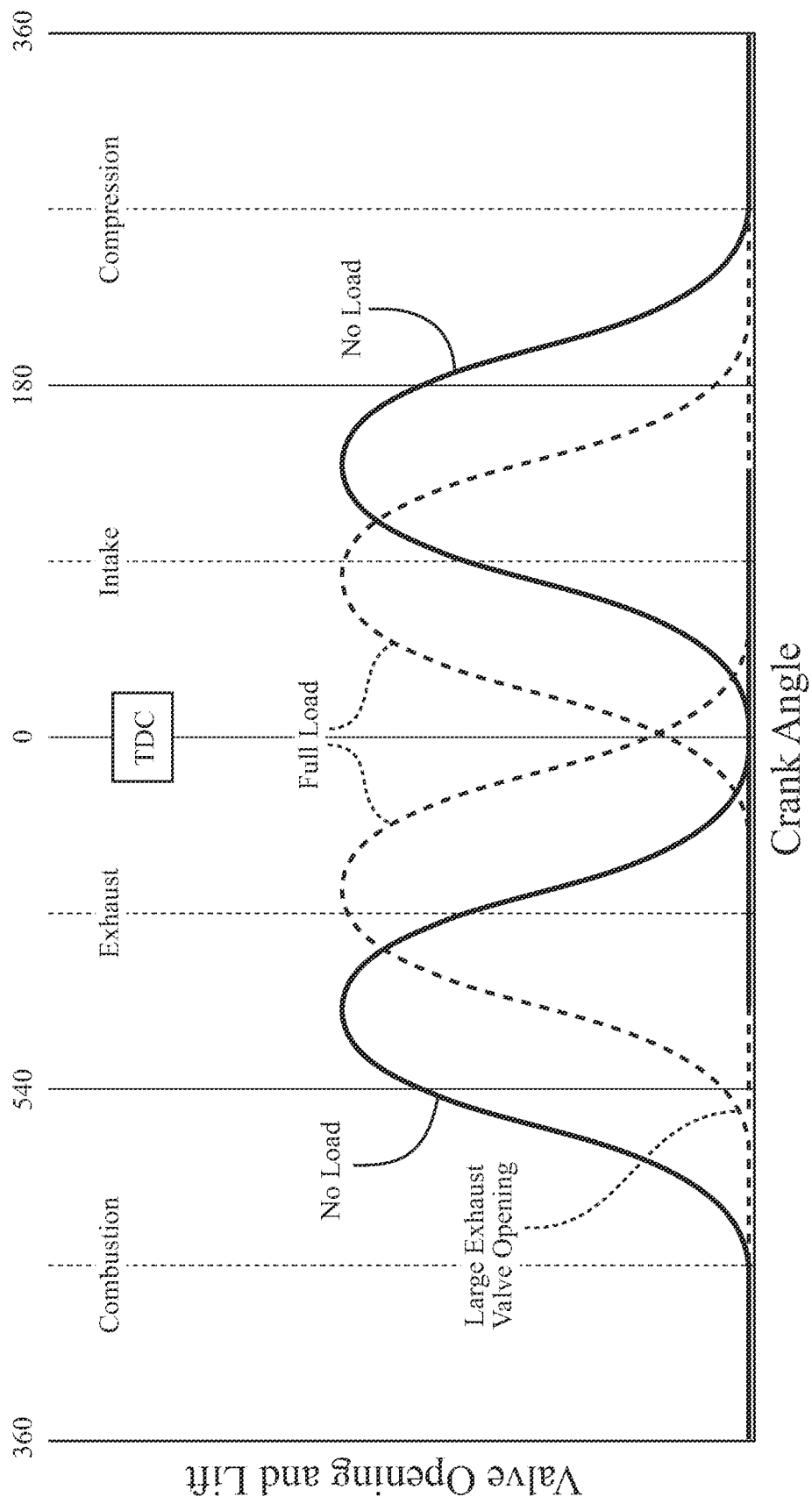
FIG. 6 is a further graphical depiction of valve opening and lift versus crank angle over the internal combustion process spanning each of the combustion, exhaust, intake and compression subset cycles.

FIG. 6 is a further graphical depiction of valve opening and lift (Y axis representation) versus crank angle (X axis representation) over the internal combustion process spanning each of the combustion (360° to 540°), exhaust (540° to 0°), intake (0° to 180°) and compression (180° to 360°) subset cycles. Also represented is a shift existing between no load (shown in solid) and full load (in phantom) curves across the depicted range, these corresponding to each of suction and exhaust stages of the cycle.

FIGS. 7 and 8 provide a pair of tabular depictions of inlet manifold pressure for different engine RPM and to show injection timing/angle before top dead center (also defined as end of compression) based on a 720 degrees for a full 4 stroke cycle. This includes FIG. 7 further depicting a cooler engine configuration 60° Celsius and FIG. 8 a warmer engine configuration of 80° C., this corresponding to an earlier injection condition.

Additional features include modifying the ignition timing (also termed timing advance) of the combustion cycle within the chamber. In a spark ignition internal combustion engine, ignition timing is defined as the timing, relative to the current piston position and crankshaft angle, of the release of a spark in the combustion chamber occurring near the end of the compression stroke.

The need for advancing (or retarding) the timing of the spark is dependent on the efficiency of fuel combustion (it being understood that fuel does not completely burn the instant the spark is fired). The combustion gases take a period of time to expand, with the angular or rotational speed of the engine lengthening or shortening the time frame in which combustion and expansion should occur.

As is also known, the firing angle will be described as a certain angle advanced before top dead center (BTDC). Advancing the spark BTDC means that the spark is energized prior to the point where the combustion chamber reaches its minimum size, since the purpose of the power stroke in the engine is to force the combustion chamber to expand. In this fashion, sparks occurring after top dead center (ATDC) are usually counter-productive and result in any of wasted spark, backfiring of the engine, engine knock, etc., and unless there is need for a supplemental or continuing spark prior to the exhaust stroke.

Given the above, establishing the correct ignition timing is crucial in the performance of an engine, as sparks occurring too soon or too late in the engine cycle are often responsible for excessive vibrations and even engine damage. The ignition timing affects variables including engine longevity, fuel economy, and engine power.

As is also known, modern engines that are controlled in real time by an engine control unit (ECU) use a computer to control the timing throughout the engine's RPM and load range. Older engines that use mechanical distributors rely on inertia (by using rotating weights and springs) and manifold vacuum in order to set the ignition timing throughout the engine's RPM and load range.

Considerations for establishing proper ignition timing for a given engine include each of the timing of the intake valve(s) or fuel injector(s), the type of ignition system used, the type and condition of the spark plugs, the composition of the fuel (including its introduced temperature and pressure), the engine speed (RPM) and load, air and engine temperature, turbo boost pressure or intake air pressure, the components used in the ignition system, and the settings of the ignition system components. As is also known, any major engine changes or upgrades will require a change to the ignition timing settings of the engine.

Applying to the present invention, and as the combustion pressure curve is optimized to the crank rod angle, the initiation of combustion is the main timing factor, such that at low RPM (1000-2000 RPM) it is more controlled and optimized, such as where an advance ignition of 30-degree BTDC (Before Top Dead Center) is sufficient. In contrast, and at higher RPM‖s, it is not as effective due to the timing the water part of the fuel mixture turning into steam.

Figure 9:
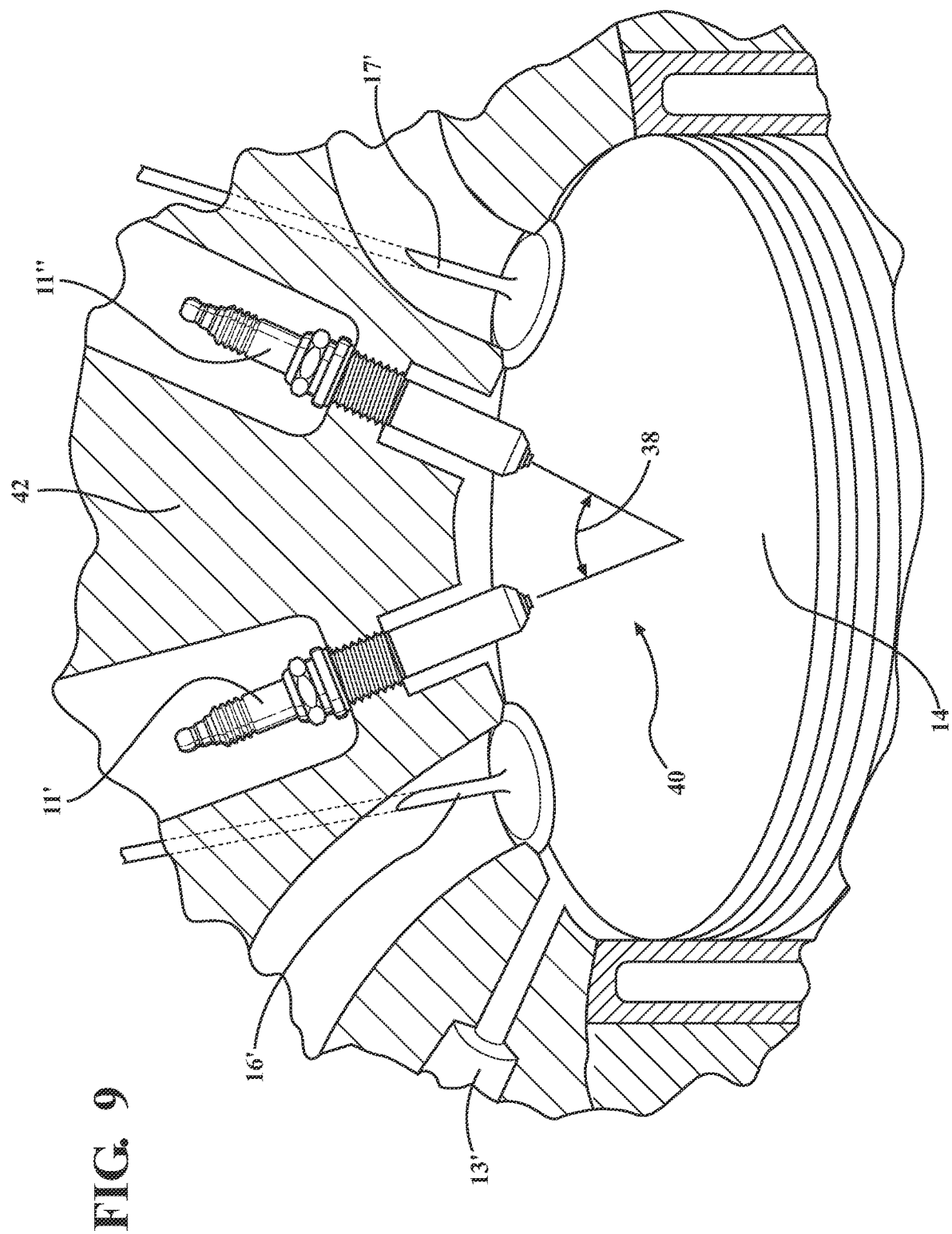
FIG. 9 presents a rotated perspective cutaway of the engine block shown in FIG. 1, further depicting the schematic arrangement of the pair of spark plugs for increasing power output, such as at engine speeds greater than 2500 rpm.

Referring now to FIG. 9, and in an additional embodiment, the single spark plug (at 11 in FIG. 1) utilized with the individual cylinder is substituted by a pair of spark plugs, see at 11☐ and 11☐ for increasing power output, such as at engine speeds greater than 2500 rpm. The plugs 11☐/11☐ are strategically located from offset angular directions, see angle 38 relative to combustion chamber is generally depicted at 40.

As further shown, the pair of spark plugs 11☐/11☐ can be configured within an integral portion of a cylinder head 42 located above piston head 44 (with the continuously varying relative space therebetween defining the dimensions of the combustion chamber 40). Also depicted are each of a reconfigured fuel injector 13☐, intake valve 16☐ and exhaust valve 17☐ relative to that depicted in the embodiment of FIG. 1. In operation, increases the power output by around seven percent at engine speed higher than 2500 RPM (the significance of the power output accordingly being greater in larger bore engines where the combustion chamber is bigger).

Other features include the use of DME (Dimethyl Ether Ethanol) in the wet fuel mixture, this performing similarly to Ethanol it performs and produces similar power and efficiency. Traditionally, dimethyl ether (DME and $CH_3OCH_3$) is generally produced by dehydration of methanol. The methanol production and dehydration processes are combined in one reactor, such that dimethyl ether is produced directly from synthesis gas slightly more efficient than methanol. In addition, the direct synthesis of dimethyl ether allows a hydrogen□carbon monoxide ratio of approximately one, which is an advantage for oxygen blown gasifiers. DME is now produced from captured CO2, therefore the use of this fuel in the present system creates a positive effect on global warming concerns, given use of DME from captured Co2.

Also, elevated heating of the fuel mixture increases efficiency, as it results in more complete combustion of the hydrocarbons in the wet alcohol mixture. Specifically, heating of the fuel above the Ethanol boiling point (without limitation above 78 degrees Celsius), combined with increasing the fuel pressure (such as from approximately 60 psi in typical fuel injector situations to above 2000 psi post fuel pump), results in the wet alcohol (such as ethanol/alcohol) mixture not boiling in the fuel system, and until sprayed into the chamber at which point it boils just prior to being combusted and as it reverts back to atmospheric pressure.

The combined heating and pressurization of the fuel results in improved atomization, with such heating of the fuel capable in one application of being accomplished without application of any extraneous heat source (with heating of the wet alcohol mixture to the desired temperature resulting from the pressurization alone of the fuel). By way of brief explanation, compression of the fluid by itself increases the momentum of the fluid molecules and, thus, the kinetic energy. As a result, the molecules become faster and the temperature consequently rises with higher pressurization resulting in higher temperatures.

Alternatively, a supplementary and separate heat source can be supplied to the fuel either during or post pressurization at the heat pump (again such also being understood to be additional or supplemental to the inherent heating aspect involved with pressurizing the fuel mixture). Supplemental heating can again include utilization of a convective heat transfer process utilizing the inflow 20 and outflow 21 lines of FIG. 1 extending to and from the engine (not shown) when and where needed and in order to achieve the desired temperature increase of the compressed wet fuel mixture above its normal atmospheric boiling point. Such supplemental heating can also include provision of other separate and non-engine related heating components known in the technical art (again such as built into the fuel pump or at a pressurized downstream location relative thereto.

Figure 10:
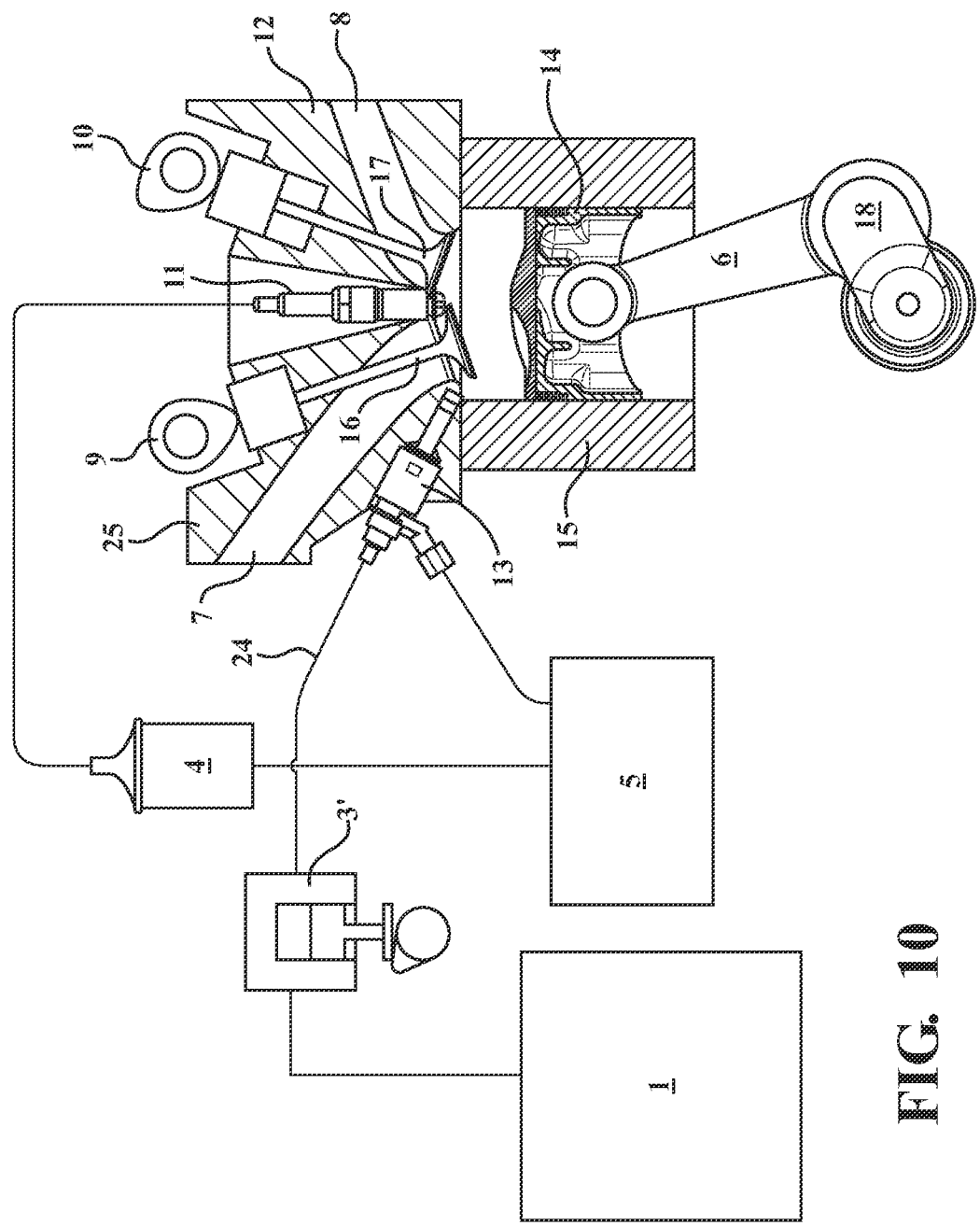
FIG. 10 presents a diagrammatic view similar to FIG. 1 with a reconfigured fuel pump pressurizing the fuel mixture in excess of 2000 psi, combined with concurrent or downstream heating of the pressurized fuel which is beyond a normal boiling temperature at atmospheric pressure, and in order to prevent boiling prior to the elevated heated fuel being sprayed into the combustion chamber.

Accordingly, FIG. 10 presents a diagrammatic view similar to FIG. 1, with the previous arrangement of the heat exchanger 2 with coolant inflow 20 and outflow 21 lines being removed in favor of a reconfigured fuel pump 3' for pressurizing the fuel mixture, such as without limitation in excess of 2000 psi. Without limitation, the heating and pressurization of the fuel can be concurrently accomplished within the reconfigured heat pump 3□ (with or without the application of extraneous heat sources for elevating the temperature of the wet fuel mixture to in excess of seventy eight degrees Celsius).

Alternatively, the heating of the wet alcohol fuel mixture can be accomplished downstream from the fuel being pressurized in a fashion which is beyond a normal boiling temperature of the mixture at atmospheric pressure, this again in order to prevent boiling prior to the pressurized and heated fuel being communicated through the high pressure fuel line 24 and sprayed into the combustion chamber by the fuel injector 13. Without limitation, it is also understood that the arrangement of FIG. 1 can be utilized in this situation and in which the elevated heating of the wet fuel mixture (such as to temperatures in excess of 78 degrees C.) is facilitated at a sufficient pressure to prevent atmospheric pressure inducing boiling prior to the heated fuel being sprayed into the combustion chamber.

As is further shown, higher engine RPM corresponds to an earlier injection and, when manifold pressure is high (i.e., high load—less vacuum) the injection is delayed. In this manner, the injection timing is crucial to maintain high torque and efficiency in all speed load combinations and to achieve a stable and efficient combustion based on each of speed, load and temperature variables.

Other and additional features associated with the present invention include each of the following:

Early Spark □ Start of Ignition:

An early ignition is important to an □idea□ pressure vs. crank angle timing sync, thus generally the start of ignition should start at 40-45 degrees before top dead center, and this should be always controlled by the ECU, as low RPM and High RPM requires different timing.

Hot Intake Air:

When using a turbocharger in the system, it has been found that no intercooler is needed, actually the efficiency is increased without one as the intake air is heated up by the turbocharger which help for a more homogenized combustion.

Long Stroke:

Due to the nature of a longer duration combustion, achieving a longer stroke has been found to better utilize the pressure characteristic, and to yield more power, it will also allow for a very late exhaust valve opening in relation to the piston position on the way down from the TDC position.

Using Heat:

A direct correlation has further been identified of the heat vs. efficiency and performance. While this also occurs in other combustion methods, the ability of the present invention to delay/raise fuel detonation, results in the ability to raise the working temperatures of the engine without the occurrence of engine knock or run-on, with the result that all thermal barriers which help retain the heat within the engines will contribute to a conversion of a wasted heat to increase in performance and efficiency.

Hot Plug:

Experimentation has found that a hot rated spark plug will provide better output, as it acts as a spark/glow plug combination.

Low RPM.

Other observations of the present invention have found the ability to establish high torque at low to mid RPM, which is atypical for conventional engines of comparable size. In such instance, the engine is working and making about 85% of its maximum torque even at a rating of 1000 RPM.

Given the above description, objective attained by the present invention include a steam-induced late cycle pressure increase associated with a high percentage of water in the alcohol/water mixture operating to prolong the cylinder pressure which leads to the indicated mean effective pressure (IMEP) being increased, this leading to a higher torque of the engine. The late cycle pressure increase results from delayed Start-of-Combustion (SOC) in combination with the effect of in-cylinder conversion of the high water-content fuel to steam, this leading to an improved indicated mean effective pressure (IMEP). This effect again results from the longer pressure pulse during the period of preferred mechanical advantage of the crank-arm as referenced in the drawings and which occurs without increase in the friction mean effective pressure (FMEP) or the pumping mean effective pressure (PMEP), collectively resulting in a net BMEP benefit.

The internal combustion process with wet-alcohol fuel as described is envisioned to operate within a relatively high compression ratio of between 10:1 and 25:1 determined by the type of engine being configured, wherein the configuration is either naturally aspirated (NA) or boosted. The present invention further contemplates lower compression ratios used for boosted configurations and higher compression ratios for NA engines.

The internal combustion process with wet-alcohol fuel as described includes the capability to operate under transient conditions for both a) speed and b) load of the engine output torque. This is due to a combustion process that contains the individual claims embodied in this patent and in which the powertrain includes at least a multi-speed transmission and a final drive in any configuration. The ability to control the engine for transient operation is comprised in the proper use of all the claims of this patent.

As described, pre-heating techniques contemplate heating the fuel, such as to a temperature of approximately 60-80 degrees Celsius (C) and, with reference again to FIG. 1, may include without limitation passing the fuel initially through the electric heater during warm-up and utilizing the waste-engine heat after operating temperature is achieved.

Other features include controlling of the air/fuel ratio (also AFR) through a control system containing a Mass Air Flow (MAF) sensor, a Lambda Sensor or Sensors and a digital Electronic Control Unit (ECU). In one non-limiting variant, the AFR value is controlled between 13:1 and 16:1. Furthermore, under transient operating conditions the enrichment may go to Lambda 0.95.

Fuel injection timing aspects include the internal combustion process with wet-alcohol fuel being programmed into the digital ECU. Under warm-up conditions (typically in a range of 60 degrees C. to 100 degrees C.) the fuel is injected late, or near the end of the intake cycle (~180 degrees Before Top Dead Center (BTDC)). At operating temperature, the fuel is injected early at the beginning of the intake cycle (~360 degrees BTDC). Under heavy load at any engine speed the fuel injection event is between 320 degrees and 250 degrees BTDC. At light load and high speed the injection events are very early at 420 degrees to 360 degrees BTDC. The majority percentage of water to alcohol can further include any relative percentage range of up to 80% water corresponding to a decreasing range down to 20% alcohol.

The present invention provides valve timing features in which the combustion techniques can be applied to engines having any valve train actuation type from an in-block single mechanical camshafts to single or multiple over-head mechanical camshafts and to advanced valvetrain actuations systems such as hydraulic, pneumatic or electromagnetic completely-variable valve-actuation systems. The mechanical camshaft actuation system also includes techniques for independent intake and exhaust cam phasing when available or for single mechanical camshaft engines, this including a reasonable compromise for valve timing and overlap.

Specific valve train actuation events can also include valve actuation based on speed and load variables. At high speed and low-load the intake valve closing (IVC) event includes a late IVC and, for high-speed and high-load conditions, the IVC event is performed early or at a more traditional timing. Valve overlap timing also contemplates, under high load, an increasing overlap, with absence of an overlap at lower loads. Depending on the valve actuation technique employed, the control of these parameters include a cam phasing device controlled by the digital ECU, or has the potential in more sophisticated and future actuation devices that may be completely performed by the digital ECU. Reference again is made to FIG. 6 which shows the typical relationships between valve events and speed/load.

Other aspects of the present design also include the engine concept having special geometric design specialties. This would include the intake system exhibiting an intake valve that is smaller than typical sized combustion engines of an equal displacement-class to provide for control of the air flow.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, ‖first‖, ‖second‖, ‖third‖, ‖primary‖, ‖secondary‖, ▯main▯ or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

We claim:

1. An internal combustion-type engine capable of burning a wet-alcohol fuel having both a water component and an alcohol component, comprising:
    a piston reciprocating within a cylinder attached to a cylinder head and connecting a crank shaft via a crank arm;
    an intake cam and valve mounted within an intake port formed in the cylinder head and an exhaust cam and valve mounted within an exhaust port also formed in the cylinder head;
    the fuel being pressurized and heated above an atmospheric boiling point prior to being injected into the cylinder by a fuel injector separate from the introduction of air and prior to combustion; and
    a percentage of the water component in the fuel operating to prolong a cylinder pressure prior to ignition of the fuel in order to increase a mean effective pressure, leading to a higher torque of the engine via a longer pressure pulse attained during a period of a mechanical advantage of the crank arm.

2. The invention as described in claim 1, further comprising a glow plug triggering ignition of the fuel.

3. The invention as described in claim 1, further comprising at least one spark plug mounted within said cylinder head for triggering ignition of the fuel.

4. The invention as described in claim 3, further comprising an engine control unit (ECU) in communication with said at least one spark plug via an ignition coil.

5. The invention as described in claim 4, further comprising said electronic control unit (ECU) separately communicated to each of said fuel injector and said at least one spark plug.

6. The invention as described in claim 5, further comprising a pressurizing fuel pump for delivering pressurized fuel to the injector via a high pressure fuel line.

7. The invention as described in claim 5, further comprising a fuel tank connecting, via a cold side fuel feed, with a heat exchanger component, the heat exchanger component being supplied by a coolant fluid inflow on a hot side and a coolant fluid outflow on a cold side and further communicating, via the fuel line, from a hot side to the engine via the pressurizing fuel pump.

8. The invention as described in claim 7, further comprising pre-heating said heat exchanger component for heating the fuel to a temperature range between 60-80 degrees Celsius (C).

9. The invention as described in claim 1, further comprising said water and alcohol components being provided in an inverse range of between 20% to 80% by volume of the overall fuel mixture.

10. The invention as described in claim 3, said at least one spark plug further comprising a pair of spark plugs located in offset angular directions relative to a combustion chamber within the cylinder.

11. The invention as described in claim 1, further comprising a ratio of a maximum to a minimum volume of a space enclosed by the piston of an internal-combustion engine during a full stroke compression ratio being between 10:1 to 25:1.

12. The invention as described in claim 11, further comprising an air fuel ratio controlled by a control system containing any of a mass air flow sensor (MAF), lambda sensor in communication with the ECU, wherein the air fuel ratio is controlled at compression ratios of between 13:1 and 16:1.

13. The invention as described in claim 12, further comprising the lambda sensor having a reading of 0.95.

14. The invention as described in claim 1, further comprising ignition of the fuel occurring up to a thirty degree Before Top Dead Center position at a 1000-2000 RPM speed.

15. The invention as described in claim 1, the wet alcohol fuel further incorporating a dimethyl ether ethanol component combined with water.

16. The invention as described in claim 1, heating of the fuel above its atmospheric boiling point prior to injecting into the cylinder further comprising heating above seventy eight degrees Celsius, combined with increasing the pressurized fuel to at least two thousand psi.

17. An internal combustion-type engine capable of burning a wet-alcohol fuel having both a water component and an alcohol component, comprising:
    a piston reciprocating within a cylinder attached to a cylinder head and connecting a crank shaft via a crank arm;
    an intake cam and valve mounted within an intake port formed in the cylinder head and an exhaust cam and valve mounted within an exhaust port also formed in the cylinder head;
    the fuel being pressurized and heated prior to being injected into the cylinder by a fuel injector separate from the introduction of air and prior to combustion;
    a pair of spark plugs mounted within said cylinder head and located in offset angular directions relative to a combustion chamber within the cylinder for triggering ignition of the fuel; and
    a percentage of the water component in the fuel operating to prolong a cylinder pressure prior to ignition of the fuel in order to increase a mean effective pressure, leading to a higher torque of the engine via a longer pressure pulse attained during a period of a mechanical advantage of the crank arm.

18. The invention as described in claim 17, further comprising ignition of the fuel occurring up to a thirty degree Before Top Dead Center position at a 1000-2000 RPM speed.

19. The invention as described in claim 17, the wet alcohol fuel further incorporating a dimethyl ether ethanol component combined with water.

20. The invention as described in claim 13, the heating of the fuel prior to being injected into the cylinder further comprising heating above its atmospheric boiling point.

21. The invention as described in claim 20, further comprising heating the fuel above seventy-eight degrees Celsius, combined with increasing the pressurized fuel pressure to at least two thousand psi.

* * * * *